Feb. 22, 1955
R. R. FEATHERSTON
2,702,694
AUXILIARY CARBURETOR AND FUEL VAPORIZER
FOR INTERNAL-COMBUSTION ENGINES
Filed Aug. 8, 1951
2 Sheets-Sheet 1
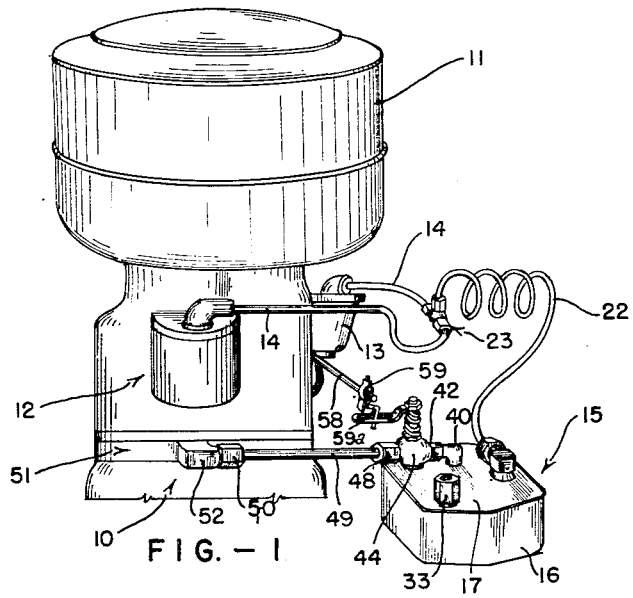
FIG.—1
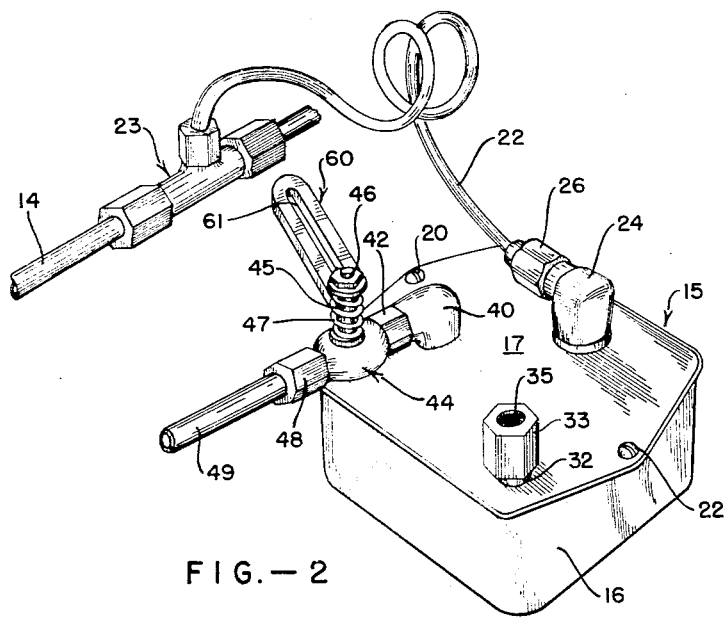
FIG.—2
INVENTOR.
Robert R. Featherston
BY
*H. A. McGrew*
ATTORNEY

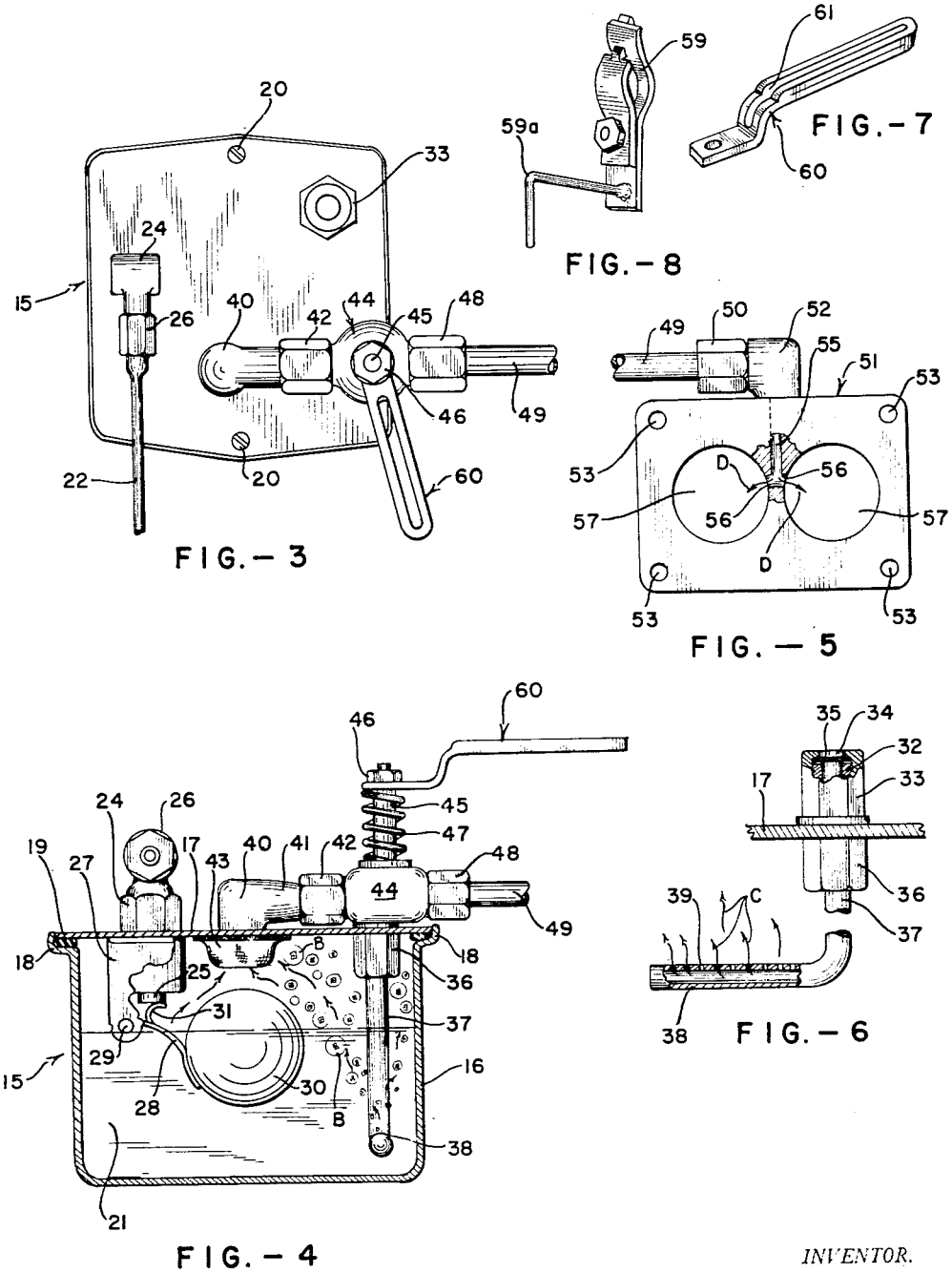

United States Patent Office 2,702,694
Patented Feb. 22, 1955

2,702,694

AUXILIARY CARBURETOR AND FUEL VAPORIZER FOR INTERNAL-COMBUSTION ENGINES

Robert Ray Featherston, Denver, Colo., assignor of one-fourth to Robert H. Van Matre, Casper, Wyo., and one-fourth to Fred G. Van Matre, Eaton, Colo.

Application August 8, 1951, Serial No. 240,969

1 Claim. (Cl. 261—23)

My present invention relates to an auxiliary carburetor and fuel vaporizer for internal combustion engines. It has to do particularly, although not exclusively, with improved means for installation with an internal combustion engine whereby the engine is caused to operate more efficiently and quietly, and more economically from the standpoint of fuel consumption than have previously known engines of the internal combustion type. The device of my present invention is capable of being installed with the internal combustion engine and with the regular carburetor for that engine at the time of manufacture of the vehicle, or it may be manufactured and sold as an accessory and installed as such with engines of conventional type having conventional carburetors and manifolding arrangements.

One of the principal objects of the present invention is to provide improved means capable of being associated with an internal combustion engine and adapted to operate in conjunction with the regular carburetor installation of that engine, whereby to decrease fuel consumption, thereby increasing mileage and also increasing the efficiency, as well as the smooth-running qualities of the engine upon which it is installed, by causing or effecting the complete consumption or burning of all of the fuel mixture which enters the intake manifold.

Another object of the present invention is to provide improved means of the foregoing character which is capable of being installed easily, quickly, and at low cost; it being a further object of the invention to provide a simple, durable, efficient and effective fuel injector and vaporizer which is of simple construction and which can be manufactured by quantity production at relatively low cost.

Another object of the present invention is to provide an improved auxiliary carburetor or fuel injector and vaporizer for internal combustion engines which is capable of being installed upon engines of all makes, thus enabling the installation of one of the devices upon any and all internal combustion engines after they have been delivered from the factory.

The foregoing and other objects and advantages of the present invention will appear from the following description and appended claim when considered in conjunction with the accompanying drawings forming a part of this specification wherein like reference characters designate corresponding parts in the several views.

In said drawings:

Fig. 1 is a perspective view of a portion of a conventional internal combustion engine showing one application of the auxiliary carburetor or fuel injector and vaporizer of the present invention thereto.

Fig. 2 is a perspective view of the auxiliary carburetor of the present invention showing, fragmentarily, one manner in which it may be connected with the fuel line and to the intake manifold of a conventional internal combustion engine.

Fig. 3 is a top plan view of the structure shown in Fig. 2, the auxiliary fuel line of Fig. 2 having been removed.

Fig. 4 is a vertical sectional view, partly in elevation, through the auxiliary carburetor of the present invention as seen in Figs. 1, 2 and 3.

Fig. 5 is a top plan view, partly broken away and partly in section and showing only a fragment of the auxiliary fuel line, of that portion of the device of the present invention which is interposed between the standard or main carburetor and the intake manifold of an internal combustion engine.

Fig. 6 is a fragmentary sectional elevation of the air intake means of the auxiliary carburetor of the present invention, being shown broken away to indicate size; and Figs. 7 and 8 are perspective views of details of the means for interconnecting the control means for the valve of the auxiliary carburetor and the control means for the conventional carburetor of the internal combustion engine to which the device is applied.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation.

With particular reference to Fig. 1 of the drawings, there is shown in this view parts of an internal combustion engine, there being illustrated an intake manifold 10, an air cleaner 11, a standard or main carburetor 12 and a fuel pump 13. A fuel line, a part of which is shown at 14, supplies fuel pumped by pump 13 to the standard or conventional carburetor 12. This fuel line is preferably formed from copper tubing which may be partially coiled or shaped to suit the requirements of the particular installation.

My improved auxiliary carburetor or fuel injector and vaporizer is shown in its entirety in Figs. 1, 2, 3 and 4, being indicated as a whole at 15 in these figures. As shown, it comprises a bowl-like member 16 having a removable lid or cover 17. The upper surrounding portions of the walls of the bowl-like member 16 are flanged at 18 to provide a seat for a seal or gasket 19 which may be formed of any suitable material, such as plastic, which will not be attacked by the fuel used by the engine. The removable cap or cover is preferably held in place by screws or threaded studs 20, see Figs. 2 and 3.

The member 16 provides a float-controlled bowl or chamber for maintaining a relatively constant level of a body of fuel 21, see Fig. 4, which is adapted to be fed, as hereinafter described, to the engine intake manifold 10 under the control of the engine throttle (not shown). The bowl of the auxiliary carburetor is supplied with fuel from the fuel line 14 through an auxiliary fuel line 22 which, as shown, is tapped into line 14 at 23 between the point of connection of the fuel line 14 with the fuel pump 13 and the main or conventional engine carburetor 12, see Fig. 1.

The float chamber cover 17 carries a fuel intake fitting or threaded body 24 which includes a valve chamber having a valve (not shown) said valve, however, being provided with a depending stem 25, see Fig. 4. The valve carried at the upper end of stem 25 may be of conical formation and if so is adapted to seat against a conical seat (not shown) formed in the body of member 24. The fitting or body member 24 is substantially L-shaped and its horizontal portion is externally threaded to receive a coupling nut or cap 26. This cap or coupling member 26 is attached to the auxiliary fuel feed line 22 and serves to couple the adjacent end of the feed line with the fitting 24. The cover 17 on its underside is provided with a depending bracket member 27 which carries a pivoted arm 28 whose pivot pin 29 is mounted in the lower end of bracket 27. Thus, bracket 27 provides a bearing for the pivot pin.

The arm 28 carries at its outer end a float member or ball 30 and adjacent the pivot 29, the arm 28 is provided with an upper curved portion or projection 31, the latter engaging the lower end of the valve stem 25, as may be seen in Fig. 4. It will be understood, of course, that fuel which is fed to member 24 by the auxiliary fuel line 22 will rise to substantially the level shown in Fig. 4, at which level the float valve 30 maintains the fuel feed-control valve (not shown) against its valve seat (not shown) to prevent the entrance of additional fuel from line 22 into the bowl-like chamber 16. When the level of fuel in the bowl 16 is lowered by having been fed to the intake manifold 10 in a manner hereinafter described, the upward pressure on the lower end of valve stem 25 will be reduced, allowing the fuel valve (not shown) to fall by gravity away from its seat to permit additional fuel to enter through pipeline 22 and the fitting or coupling 24, 26 into the chamber provided by bowl 16. When the desired level of fuel 21 has again been reached, the ball or float 30 serves to re-seat the valve to prevent the flow of further fuel into the bowl 16.

For the purpose of vaporizing and/or breaking up of the fuel into very small vapor-like particles, the cover member 17 also carries an externally threaded nipple 32 (see Figs 2 and 6) having a hex-nut or apertured cap 33 threaded thereonto. This cap or hex-nut 33 is provided with an opening 34 in its top and the opening is covered by a very fine mesh, preferably brass or copper, screen 35. The threaded nipple 32 preferably extends below the lid or cover 17 and is likewise externally threaded below said cover to receive and support a hex coupling member or nut 36 which serves to hold the upper end of a tube or pipe 37, 38 in position so as to depend from the member 36 and cover 17. The lower end portion 38 of the tube is preferably turned at a right angle to the upright portion 37 of the tube, as best seen in Fig. 6, to provide a horizontal portion 38. The portion 38 of the tube has a series of openings or perforations 39 formed therein. Some of the tube portion 37, and all of the tube portion 38 of the tube, are normally submerged in the fuel 21 in bowl 16. When the internal combustion engine is in operation, suction created thereby will cause atmospheric air to be drawn or sucked in through cap opening 34 and into pipe 37, 38 to be discharged in the form of air bubbles or globules, as indicated at B, in Fig. 4 and by the series of arrows C in Fig. 6. The arrows C indicate the air being emitted by the openings or perforations 39 in the pipe or tube lower portion 38.

The auxiliary carburetor 15, in addition to being connected by auxiliary fuel line 22 with the main fuel line for the engine, such as line 14, is also connected with the intake manifold 10. For this purpose, the cap or cover member 17 carries a preferably L-shaped fitting or connection 40 having an externally threaded horizontal portion 41 (see Fig. 4) which receives a hex nut 42. The underside of cover 17, in the vicinity of the member 40, has affixed thereto, in any suitable manner, as by welding or by the use of solder, a preferably dome-shaped strainer screen or member 43 which serves the purpose of straining or filtering any fluid which passes from the auxiliary carburetor bowl 16 into fitting 40 and out to the intake manifold of the engine.

Threadedly connected to the fitting 40 by the hex nut 42 is a fuel mixture control valve assembly, shown as a whole at 44. This valve assembly 44 comprises a body containing any suitable kind of a valve therein such, for example, as a rotary plug valve (not shown) which is carried by a stem 45 extending upwardly out of the valve body and having a stop nut 46 mounted upon its upper externally threaded end. The fuel mixture control valve (not shown) is preferably of the tapered body type and seats upwardly against a similarly tapered seat portion (not shown). For the purpose of maintaining the valve tightly against its seat at all times, a compression coil spring 47 is provided and is disposed between the body of valve assembly 44 and the stop nut 46 on stem 45, see Figs. 2 and 4. A hex nut 48, similar to hex nut 42 is provided at the opposite side of valve body 44 and serves to attach to said valve body a relatively short length of tubing or pipe 49. The tube or pipe 49 carries at its outer end a hex fitting or nut 50 which is threadedly connected to a threaded nipple (not shown) of a fitting 52 carried by and threadedly connected to a rectangular block or gasket-like manifold-conforming member 51, see Figs. 1 and 5.

The rectangular or oblong block-like member 51 is adapted to be interposed between carburetor 12 and manifold 10 and is provided adjacent its four corners with holes or openings 53 to receive the usual bolts of the carburetor-manifold structure. The block 51 is provided with a centrally disposed transverse bore or passageway 55 terminating in two branch passageways 56, 56 which communicate with the centrally disposed openings 57, 57 and which are in registry with the manifold and carburetor passageways (not shown) when the device is installed as seen in Fig. 1 of the drawings. It is to be understood that when the engine is in operation, a mixture of fuel and air in minute mist-like form will be drawn directly into the intake manifold 10 through block 51 from the auxiliary carburetor 15 through the interconnecting means just described.

The throttle control means for the main carburetor 12, as shown, includes an operating rod, such as rod 58 (see Fig. 1) which carries a clamp member 59 secured to the end portion of rod 58 in the vicinity of the auxiliary carburetor 15. The valve stem 45 of the auxiliary carburetor has an upper end portion or extension on which is mounted an arm 60, the arm having a longitudinal slot 61 formed therein. The inner end of the arm 60 is fixedly connected to valve stem 45 and thus serves to turn the valve in the valve body. The clamp member 59 carries a depending preferably L-shaped arm or finger 59a whose lower free end is adapted to engage in the longitudinal slot 61 of valve-operating arm 60. It will be understood, therefore, that when the main throttle control, including the rod 59, is operated by the accelerator pedal of the vehicle to control the operation of the main carburetor 12 for the engine, the valve in valve assembly 44 will be moved in conjunction with the parts through the medium of the interconnecting members, namely clamp 59, depending arm 59a, and the slotted lever or arm 60. Thus, as the throttle or butterfly valve of the main carburetor is operated to allow a mixture of fuel and air in the proper proportions to enter the intake manifold 10 of the engine, the valve (not shown) in valve assembly 44 of the auxiliary carburetor is likewise opened to allow the passage of a mist-like formation comprising a mixture of fuel and air to flow from the auxiliary carburetor bowl 16 through the screened outlet, through fitting 40, 41 and past the valve in the valve assembly 44 and through connecting pipe 49 to the manifold-engaging block or member 51, from whence it passes into the intake manifold 10 in the direction of the arrows D shown in Fig. 5 of the drawings.

While I have shown in Figure 5 a type of spacer or block-like member 51 which is adapted to fit between the main carburetor, shown as a whole at 12 in Fig. 1, and the intake manifold, shown as a whole at 10 in that figure, as being of rectangular formation or shape, it will be understood that this member will be shaped to correspond to the shape of the manifold and the adjacent portion of the carburetor in accordance with the particular internal combustion engine with which it is used. Moreover, it will be understood that the linkage connections or parts, namely the parts 59, 59a, 60, etc., between the control means for the main carburetor of the engine and the auxiliary carburetor, may be of various kinds and may be shaped and proportioned to fit or suit the particular engine upon which the auxiliary carburetor of my invention is installed.

Conventional carburetor installations for internal combustion engines ordinarily have a very high consumption of fuel due to the fact that the fuel is not properly and completely vaporized before it enters the engine intake manifold. This condition also causes uneven running of the engine, such as "loping," and other undesirable and inefficient operative effects. It is, therefore, one of the chief purposes of my present invention to smooth down the running of the engine as well as to enhance its pick-up, get-away, and generally efficient operation. When an engine of the internal combustion type is provided with an auxiliary carburetor or fuel injector and vaporizer of my present invention, the smoothness of operation, quick pick-up and general efficiency, as well as the silent operation of the engine, are all markedly present and immediately observed. With such an installation, when the engine is idling, the vacuum is high and the valve located in the valve assembly 44 remains closed, or substantially closed. The same is true when the engine is running at an idling speed after having been subjected to high acceleration.

When acceleration of the engine occurs through operation of the controls for the main carburetor and the vacuum drops as the R. P. M.'s increase, the valve in valve assembly 44 is opened, whereupon air and fuel vapors in minute particles and in preferably mist-like form are drawn from the auxiliary carburetor bowl 16 directly into the intake manifold 10 through the spacer or block-like member 51 and the conduits formed therein which are in communication with the pipeline 49 as previously described.

The valve member (not shown) in the valve assembly or body 44 is, in reality, an air valve. What actually happens is that upon acceleration of the engine and the opening of the valve, fuel-laden air, such as indicated at B in Fig. 4, passes directly into the intake manifold of the engine and thus provides an auxiliary supply of a proper mixture for the efficient running or operation of the engine. Since the fuel picked up by the sucked-in air is taken from the auxiliary carburetor 15 in minute quantities, very little fuel is used during the running of the engine. The thoroughly fuel-saturated air which is drawn into the manifold directly from the auxiliary carburetor 15, serves to smooth down the running of the engine, makes for more complete combustion and, in fact, causes the complete burning of all of the fuel in the fuel and air mixture fed into the manifold of the engine. By thus providing a complete consumption of all of the fuel mixture, the efficiency as to operation of the engine is not only materially increased but the economical operation thereof is extremely noticeable. There have been many instances of the increase in mileage and the lowering in the consumption of fuel of as much as 20% because of the use of the auxiliary carburetor of my present invention. Many actual test and ordinary runs have been made with the carburetor of my present invention installed with a conventional carburetor in an internal combustion engine assembly and the results have been most gratifying from the standpoint of satisfactory performance as well as fuel economy.

From the foregoing it will be seen that I have provided a new and improved auxiliary carburetor or fuel injector and vaporizer which increases materially the efficiency of an internal combustion engine and also simultaneously reduces the fuel consumption of said engine, thereby reducing substantially the cost of operation. This is particularly important in the present days of high fuel prices and when the trend of the automotive industry seems to be in the direction of speed and performance, regardless of high fuel consumption.

I claim:

An auxiliary carburetor for supplying air and vaporized fuel into an intake manifold in addition to the primary supply of air and fuel from a primary carburetor for an internal combustion engine, comprising, a bowl having a removable cover, a fuel conduit interconnected with the fuel line of a primary carburetor and communicating with said bowl through said cover, a float valve assembly for said conduit supported from said cover and extending internally of said bowl for maintaining a substantially constant level of fuel in said bowl, a screened air inlet extending through said cover and spaced from said fuel conduit, an air conducting pipe extending from said air inlet into said bowl, the inner free end of said pipe being disposed at an angle and submerged in said fuel, said free end being provided with a plurality of perforations to emit air bubbles into the fuel below the surface thereof, a screened air-fuel vapor outlet opening extending through said cover, an air-fuel vapor conduit communicating from said vapor outlet to an intake manifold between an engine and its primary carburetor, valve means controlling said vapor conduit, and means interconnecting said vapor control valve to the throttle of said primary carburetor whereby a vaporized mixture of fuel and air is admitted to said intake manifold conjointly with the operation of the throttle of said primary carburetor.

References Cited in the file of this patent

UNITED STATES PATENTS

| | | |
|---|---|---|
| 1,191,097 | Speirs | July 11, 1916 |
| 1,355,094 | Ihrig | Oct. 5, 1920 |
| 1,634,022 | Dalton | June 27, 1927 |
| 2,221,472 | Ennis | Nov. 12, 1940 |
| 2,235,357 | Conklin | Mar. 18, 1941 |
| 2,384,609 | De Vries | Sept. 11, 1945 |